US012769328B2

(12) United States Patent
Xi

(10) Patent No.: US 12,769,328 B2
(45) Date of Patent: Oct. 20, 2026

(54) COLLISION-FREE DYNAMIC WINDOW APPROACH FOR MOVING OBSTACLES

(71) Applicant: Rutgers, the State University of New Jersey, New Brunswick, NJ (US)

(72) Inventor: Zhimin Xi, Basking Ridge, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 173 days.

(21) Appl. No.: 18/705,134

(22) PCT Filed: Oct. 25, 2022

(86) PCT No.: PCT/US2022/047693
§ 371 (c)(1),
(2) Date: Apr. 26, 2024

(87) PCT Pub. No.: WO2023/076242
PCT Pub. Date: May 4, 2023

(65) Prior Publication Data

US 2025/0044808 A1 Feb. 6, 2025

Related U.S. Application Data

(60) Provisional application No. 63/273,571, filed on Oct. 29, 2021.

(51) Int. Cl.
*G05D 1/633* (2024.01)
*G05D 101/00* (2024.01)

(52) U.S. Cl.
CPC ......... *G05D 1/633* (2024.01); *G05D 2101/22* (2024.01)

(58) Field of Classification Search
CPC .. G05D 1/633; G05D 2101/22; G05D 1/0214; B60W 30/143; B60W 2554/4042
See application file for complete search history.

(56) References Cited

U.S. PATENT DOCUMENTS

2009/0093960 A1* 4/2009 Puhalla ................ B60W 30/09 701/301
2014/0148989 A1* 5/2014 Ueda .................... G05D 1/0088 701/23

(Continued)

OTHER PUBLICATIONS

International Search Report and Written Opinion issued in PCT/US2022/047693 mailed Jan. 31, 2023 (21 pages).

*Primary Examiner* — Aniss Chad
*Assistant Examiner* — Nikki Marie M Molina
(74) *Attorney, Agent, or Firm* — Lerner David LLP

(57) ABSTRACT

A robot is navigated to a target location passively collision-free. An obstacle (21) is detected by sensors. An obstacle velocity dynamic window is calculated within a control cycle. An obstacle mobility boundary is determined and inflated to an inflated boundary that includes a collision threshold. Admissible velocities of the robot are identified as those in which the robot would be outside the inflated boundary at a next control cycle or the robot velocity is reduced if there is no admissible velocity. An optimal velocity among admissible velocities is selected. The position of the robot is updated, and the process is repeated until the target location is reached. Without the use of an inflated boundary, admissible velocities of the robot are identified as those that avoid projected obstacle boundaries for a preset number of possible obstacle trajectories.

20 Claims, 5 Drawing Sheets

(56) References Cited

U.S. PATENT DOCUMENTS

| | | | | |
|---|---|---|---|---|
| 2019/0094866 | A1* | 3/2019 | Moore | G05D 1/0289 |
| 2020/0041274 | A1 | 2/2020 | Lalonde et al. | |
| 2020/0180634 | A1* | 6/2020 | Hammoud | G08G 1/163 |
| 2020/0310444 | A1 | 10/2020 | Hasegawa et al. | |
| 2021/0261159 | A1* | 8/2021 | Pazhayampallil | B60W 30/09 |
| 2022/0371582 | A1* | 11/2022 | Sato | G05D 1/617 |

* cited by examiner

COLLISION-FREE DYNAMIC WINDOW APPROACH FOR MOVING OBSTACLES

CROSS-REFERENCE TO RELATED APPLICATIONS

The present application is a national phase entry under 35 U.S.C. § 371 of International Application No. PCT/US2022/047693 filed Oct. 25, 2022, which claims the benefit of U.S. Provisional Application No. 63/273,571, filed Oct. 29, 2021, the disclosure of which is hereby incorporated by reference in its entirety herein.

FIELD

The present invention generally relates to collision-free control of autonomous robots and a robot having such control, and in particular relates to a process using a collision-free dynamic window approach (DWA) for avoiding moving obstacles and a robot and system configured for avoiding obstacles using the approach.

BACKGROUND

A primary requirement for autonomous vehicles (AVs) is to be collision-free, and autonomous navigation should in theory guarantee a collision-free environment under normal operating conditions. Vehicles configured to operate under the DWA satisfy this requirement under certain conditions. In general, the DWA involves a determination of velocities that are reachable by an AV agent within a defined, typically short, time interval and then selecting an admissible, i.e., collision-free and thereby safe, velocity among the determined velocities. A velocity dynamic window $V_d$ for a vehicle is determined by the following:

$$V_d = \{(v, \omega) | v \in [v_c - \dot{v}_d\Delta t,\ v_c + \dot{v}_d\Delta t] \cap \omega \in [\omega_c - \dot{\omega}_d\Delta t,\ \omega_c + \dot{\omega}_a\Delta t]\} \quad \text{(Criterion 1)}$$

where $v_c$ and $\omega_c$ are current translational and angular velocity; $\dot{v}_a$ and $\dot{v}_d$ are translational acceleration and deceleration, respectively; $\dot{\omega}_a$ and $\dot{\omega}_d$ are angular acceleration and deceleration, respectively; and $\Delta t$ is control cycle time, e.g., 0.1 second. Criterion 1 may be applied for both two-dimensional (2-D) and three-dimensional (3-D) vehicle systems. In contrast to the velocity determinations for 2-D applications, velocity determinations for 3-D applications include translational velocity along the z-axis direction, as well as translation velocities along the x- and y-axes as in 2-D settings, and further include yaw $\dot{\theta}$ and roll $\dot{\varphi}$ rotational velocities, in addition to the pitch $\dot{\beta}$ rotational velocities as in 2-D settings. Thus, for 2-D systems, $v=[\dot{x},\dot{y}]$ and $\omega=\dot{\beta}$ whereas for 3-D systems, $v=[\dot{x}, \dot{y}, \dot{z}]$ and $\omega=[\dot{\beta}, \dot{\theta}, \dot{\varphi}]$.

A properly designed DWA is considered to be collision-free for static obstacles, as shown in the example of FIG. 1. Under static operating conditions, if there is no admissible velocity within the velocity dynamic window (DW) for an AV agent, the agent reduces its velocity as much as possible. As such, the agent is collision-free so long as the projected time T for any collision is large enough for the agent to fully stop. Similarly, if the future trajectory of moving obstacles is known, the agent remains collision-free by choosing only an admissible velocity. In a modification, an agent selects a velocity among all inadmissible velocities when there are no admissible velocities. If all agents within an AV environment are passively collision-free, collisions are completely avoided barring any external factors since each of the agents choose only admissible velocities.

Current DWA approaches considering moving obstacles that are of unknown future velocity use trajectory prediction for moving obstacles so that admissible velocities of the agent can be determined. However, the longer the future prediction period, the larger the prediction error. Probabilistic trajectory prediction may alleviate the problem by including a set of possible trajectories with corresponding probabilities for collision. In addition to the computational burden of such methods, there is still a certain probability that the actual trajectory of an obstacle is outside a predicted confidence interval. Furthermore, such a confidence interval prediction itself could be inaccurate due to an error in the uncertainty analysis. As such, there is no guarantee for any trajectory prediction method that the predicted trajectory is accurate and thus collisions have been reported for DW approaches involving moving obstacles.

Therefore, there remains a need to enhance the ability of AV agents such that they may operate collision-free within unpredictable dynamic environments.

SUMMARY OF THE DISCLOSURE

Predicting a future trajectory of an obstacle over a relatively long time period T when the obstacle has an unknown trajectory is difficult and even when such predictions may be possible, they are subject to computational processing limitations of an agent depending on the number of samples to be taken and the sampling method applied. Without considering other constraints such as an obstacle's operational velocity space or traffic rules to follow, $V_d^{obs}$ defines an obstacle's velocity dynamic window within one control cycle $\Delta t$. By applying any velocity $(v_e, \omega_e)$ in $V_d^{obs}$ for a relatively long time period T, the obstacle's mobility boundary for the time T is calculated and defined by a set of equations as follows:

for a 2-D system, $$\begin{cases} x_k = x_0 + v_e\Delta t\sum_{i=0}^{k-1}\cos(\beta_i) \\ y_k = y_0 + v_e\Delta t\sum_{i=0}^{k-1}\sin(\beta_i) \\ \beta_k = \beta_0 + k\omega_e\Delta t \end{cases}; \quad \text{(Criterion 2.1)}$$

and for a 3-D system, $$\begin{cases} x_k = x_0 + v_e\Delta t\sum_{i=0}^{k-1}\cos(\beta_i)\cos(\theta_i) \\ y_k = y_0 + v_e\Delta t\sum_{i=0}^{k-1}\sin(\beta_i)\cos(\theta_i) \\ z_k = z_0 + v_e\Delta t\sum_{i=0}^{k-1}\sin(\theta_i) \\ \beta_k = \beta_0 + k\dot{\beta}_e\Delta t \\ \theta_k = \theta_0 + k\dot{\theta}_e\Delta t \end{cases}, \quad \text{(Criterion 2.2)}$$

where $k=T/\Delta t$ is the number of time steps; and $x_0$, $y_0$, and $\beta_0$ are the obstacle's initial (x, y) position and heading direction, respectively. For ease of reference, as described further herein and in view of Criterion 2.1 and 2.2, $\{x_i^{obs}, y_i^{obs}\}$ is the set of possible positions at each time step i within an obstacle's mobility boundary within the time interval T and $(x_i^{agent}, y_i^{agent})$ is an agent's projected position at each time step i within the time interval Tin which i=1, 2, . . . k. Assuming, for ease of example, a circular shape for the agent and the obstacle with radii $r_{agent}$ and $r_{obs}$, respectively, the admissible velocities of the agent given the mobility boundary of the obstacle satisfy the following:

for a 2-D system, $$\forall\, i,\ \|(x_i^{agent}, y_i^{agent}), \{x_i^{obs}, y_i^{obs}\}\| > r_{agent} + r_{obs}; \qquad \text{(Criterion 3.1)}$$

and for a 3-D system, $$\forall\, i,\ \|(x_i^{agent}, y_i^{agent}, z_i^{agent}), \{x_i^{obs}, y_i^{obs}, z_i^{obs}\}\| > r_{agent} + r_{obs}, \qquad \text{(Criterion 3.2)}$$

where |•| refers to the Euclidean distance operator, $r_{agent}$ is a radius of the agent, and $r_{obs}$ is a radius of the obstacle. Unlike for static obstacles or moving obstacles with known trajectories, Criterion 3.1 and 3.2 are relatively computationally expensive where $\{x_i^{obs}, y_i^{obs}\}$ is a set of obstacle positions for all $(v_e, w_e) \in V_d^{obs}$. Moreover, Criterion 3.1 and 3.2 cannot be used to ensure collision-free travel of the agent over the complete time interval T where an obstacle's velocity, and thereby the obstacle's mobility boundary, is unknown beyond a control cycle Δt. To make the agent collision-free for a subsequent control cycle, Criterion 3.1 and 3.2 need to be calculated again in view of the mobility of moving obstacles at each control cycle Δt to identify admissible velocities where the agent is collision-free.

If the set of admissible velocities is the empty set, then collision-free travel of the agent cannot be guaranteed. However, such collision-free travel is nonetheless likely because the obstacle takes only one velocity within $V_d^{obs}$ while the agent determines admissible velocities by considering all velocities in $V_d^{obs}$. Collision is only guaranteed to occur in this situation if one or multiple obstacles' chosen velocities make all of the agent's candidate velocities inadmissible until collision. Such collision, however, is due to the obstacles' chosen actions rather than the agent's. In this manner, the agent may be said to be "passively collision-free" in contrast to being "actively collision-free" in which an agent may be further configured to avoid collisions due to irrational motions of obstacles or other moving objects such as when a stationary agent vehicle is struck by another vehicle from behind. If the one or multiple obstacles are configured to apply the passively collision-free DWA such that such obstacles may be said to be passively collision-free as well, such obstacles will choose admissible velocities considering the agent's mobility boundary. Once an admissible velocity is chosen by a moving obstacle, all of the agent's candidate velocities are admissible with respect to that obstacle. If the candidate velocities for both the agent and the obstacle are all inadmissible, both the agent and the obstacle may be configured to reduce their respective velocities as much as possible. Given a sufficient time period T, collision-free travel may be guaranteed for both the agent and the obstacle when both are configured to apply the passively collision-free DWA.

For the agent to consider all velocities $(v_e, \omega_e) \in V_d^{obs}$ is computationally infeasible. As such, to ensure collision-free travel over the time interval T, the agent must be configured to identify its admissible velocities based on a finite set of velocity samples which the agent shall be configured to take for each obstacle of the set of obstacles. In accordance with an aspect of the technology, the number of obstacle velocity samples N taken from $V_d^{obs}$ for each obstacle may be the minimum number of samples required for projected mobility regions of each of the obstacles of a set of obstacles within the environment determined from such velocity samples over a predefined time interval T to cover a mobility boundary $\Pi_k$ for each obstacle of the set of obstacles over the time interval T. For clarity, the number of obstacle velocity samples N may, and often will, vary for each obstacle of a set of obstacles. In ascertaining the number of samples N, a trial number of velocity samples Q for each obstacle of the set of obstacles within an environment must be considered and varied until a number of velocity samples Q is applied in which there is no agent position $(x_i^{agent}, y_i^{agent}) \in \Pi_i$ where $\Pi_i=(x_i^{obs}, y_i^{obs})$, i.e., is the mobility boundary for an obstacle at the ith time step, and the Euclidean distance to all $(x_{i,l}^{obs}, y_{i,l}^{obs})$ where l=1, . . . , Q is larger than r. The number of samples N is set as the Q number of samples at which these criteria are met.

Once the number of obstacle velocity samples N is determined for each obstacle, then the agent may be configured to ascertain N obstacle trajectories at each time step i of length Δt over the predefined time interval T by using velocities within $V_d^{obs}$ calculated by the agent for each obstacle at each respective time step i. The agent may be further configured to evaluate M candidate velocities for the agent among velocities within the agent's velocity DW $V_d^{agent}$ at the respective time step i and then identify an optimal velocity for the agent during the subsequent time step i+1. Often, candidate velocities are subject to the control resolution of the linear and angular velocities within $V_d^{agent}$ that are achievable by the agent in view of factors such as control settings for the agent or physical limits of the agent. For example, the agent may be set such that there are five (5) available levels for a linear velocity and eight (8) available levels for an angular velocity within $V_d^{agent}$. In that example, a total of forty (40) candidate velocities within the $V_d^{agent}$ would be evaluated for consideration as the optimal velocity.

In some arrangements, the optimal velocity determined by the agent during the current control cycle $t_i$ to be applied during travel in the subsequent control cycle $t_{i+1}$ may be identified as the admissible velocity with the highest value determined by an objective function such as the following:

$$\alpha f_h(v, \omega) + \beta f_d(v, \omega) + \gamma f_v(v, \omega) \qquad \text{(Criterion 4)}$$

where v and ω are the current translational and angular velocities of the agent; $f_h(\bullet)$, $f_d(\bullet)$, and $f_v(\bullet)$ are normalized heading, distance, and velocity functions determined from the agent's current velocity pair (v, ω); and α, β, and γ are user-defined weight coefficients. When there are no admissible candidate velocities, the optimal velocity is the lowest possible velocity that may achieved during the subsequent time step i+1. The agent may be configured to then travel at the optimal velocity at the subsequent time step i+1. The agent may be further configured at each time step i to determine an optimal velocity for the agent to travel at the respective subsequent time step i+1 and to then travel at the optimal velocity at such subsequent time step until the agent reaches the destination goal.

In some arrangements, the agent may be configured to evaluate candidate velocities by applying the objective function before determining whether such candidate velocities are admissible, i.e., collision-free velocities. In some other arrangements, the agent may be configured to determine the admissibility of the collision-free velocities before applying the objective function. In such an arrangement, the agent may be further configured to not evaluate any candidate velocities relative to the objective function that are not admissible.

In accordance with another aspect, an agent's admissible velocities may be identified from the agent's velocity DW $V_d^{agent}$ as satisfying the following:

for a 2-D system, $$\forall i, (x_i^{agent}, y_i^{agent}) \notin f_{offset}(\Pi_i, r); \qquad \text{(Criterion 5.1)}$$

and for a 3-D system, $$\forall i, (x_i^{agent}, y_i^{agent}, z_i^{agent}) \notin f_{offset}(\Pi_i, r), \qquad \text{(Criterion 5.2)}$$

where $f_{offset}(\Pi_i, r)$ is a polygon offset function dependent on mobility boundary $\Pi_i$ at each time step i and offset constant r. If there is no admissible velocity that satisfies Criterion 5.1 or 5.2, as appropriate, then the velocity of the agent should be reduced as much as possible. In arrangements in which there is more than one admissible velocity, an optimal velocity may be identified as the one with the highest value determined by an objective function such as Criterion 4. The agent may be configured to then travel at the optimal velocity at the subsequent time step i+1. The agent may be further configured at each time step I to determine an optimal velocity for the agent to travel at the respective subsequent time step i+1 and to then travel at the optimal velocity at such subsequent time step until the agent reaches the destination goal.

In accordance with another aspect, a robot may navigate or may be navigated to a predetermined first static or dynamic target location. In this process, a first obstacle position of a first obstacle, a first obstacle velocity of the first obstacle at the first obstacle position, and a first obstacle acceleration of the first obstacle at the first obstacle position may be obtained during a predetermined first time cycle. A first obstacle first velocity dynamic window for the first obstacle may be determined, via one or more computer processors and during the first time cycle, based on the first obstacle velocity and the first obstacle acceleration. A first obstacle first mobility boundary defining a first set of subsequent obstacle positions reachable by the first obstacle during or at the completion of a predetermined second time cycle may be determined, via one or more computer processors and during the first time cycle, following the first time cycle from the first obstacle position based on the first obstacle first velocity dynamic window. The second time cycle may be of equal duration to the first time cycle. A first new robot velocity to be applied to the robot at the completion of the first time cycle may be selected, via one or more computer processors and during the first time cycle, from a set of first new robot velocity candidates for the robot. The first new robot velocity i) may be one at which a first new robot position of the robot at the completion of the second time cycle is outside of a first obstacle first inflated boundary of the first obstacle spaced from the first obstacle first mobility boundary by a predetermined offset or ii) may be a first reduced robot velocity when there is no reachable position for the robot outside of the first obstacle first inflated boundary at the completion of the second time cycle. The robot may be moved at the first new robot velocity during the predetermined second time cycle and immediately following the first time cycle.

In some arrangements, the first obstacle position of the first obstacle, the first obstacle velocity of the first obstacle at the first obstacle position, and the first obstacle acceleration of the first obstacle at the first obstacle position may be stored, via the one or more computer processors, in a memory.

In some arrangements, any one or any combination of the first obstacle position, the first obstacle velocity at the first obstacle position, and the first obstacle acceleration at the first obstacle position may be detected, via at least a first sensor, when being obtained.

In some arrangements, the first obstacle first inflated boundary may be determined, via the one or more computer processors, by offsetting each of the obstacle positions of the first set of subsequent obstacle positions reachable by the first obstacle during or at the completion of a predetermined second time cycle by a fixed distance in radial directions from the first obstacle first inflated boundary.

In some arrangements, the set of first new robot velocity candidates may be determined, via the one or more computer processors, from a robot first velocity dynamic window based on a current robot velocity of the robot, and a current robot acceleration of the robot during the first time cycle.

In some arrangements, the first new robot velocity may be selected by a process. In this process, a set of first new robot position candidates corresponding to the set of first new robot velocity candidates may be determined via the one or more computer processors. The set of first new robot position candidates may be at radial distances from the current position of the robot equal to a product of a length of the first time cycle and respective ones of the set of first new robot velocity candidates. The set of first new robot position candidates may be compared to the first obstacle first inflated boundary.

In some arrangements, the first new robot velocity may be selected by selecting a first new robot velocity candidate of the set of first new robot velocity candidates having the highest value based on an objective function.

In some arrangements, at or after the completion of the moving of the robot and during a predetermined subsequent time cycle, a first obstacle actual position of the obstacle, a first obstacle actual velocity of the first obstacle at the first obstacle actual position, and a first obstacle actual acceleration of the first obstacle at the first obstacle actual position may be obtained. A first obstacle subsequent velocity dynamic window for the first obstacle may be determined, via one or more computer processors and during the subsequent time cycle, based on the first obstacle actual velocity and the first obstacle actual acceleration. A first obstacle subsequent mobility boundary defining a second set of subsequent obstacle positions reachable by the first obstacle during or at the completion of a predetermined further subsequent time cycle following the subsequent time cycle from the first obstacle actual position may be determined, via one or more computer processors and during the subsequent time cycle, based on the first obstacle subsequent velocity dynamic window. A subsequent new robot velocity to be applied to the robot at the completion of the subsequent time cycle may be selected, via one or more computer processors and during the subsequent time cycle, from a set of subsequent new robot velocity candidates for the robot. The subsequent new robot velocity i) may be one at which a subsequent new robot position of the robot at the completion of the further subsequent time cycle is outside of a first obstacle subsequent inflated boundary of the first obstacle spaced from the first obstacle subsequent mobility boundary by a predetermined offset or ii) may be a subsequent reduced robot velocity when there is no reachable position for the robot outside of the first obstacle subsequent inflated boundary at the completion of the further subsequent time cycle. The subsequent and the further subsequent time cycles may be of equal duration to the first time cycle. The robot may be moved at the subsequent new robot velocity during the further subsequent time cycle. These steps then may be repeated until the robot reaches the target location.

In some arrangements, a maximum first obstacle linear velocity may be stored, via the computer processor, in a memory of the robot. In some such arrangements, the first obstacle velocity dynamic window may be limited by the maximum first obstacle linear velocity.

In some arrangements, any one or any combination of the first obstacle velocity, the first obstacle acceleration, and a maximum first obstacle linear velocity may be wirelessly received, via a radio receiver, from the first obstacle upon the detecting of the first obstacle. In some such arrangements, the one or combination of the first obstacle velocity, the first obstacle acceleration, and the maximum first obstacle linear velocity wirelessly received may be stored, via the one or more computer processors, in a memory of the robot.

In some arrangements, the set of first new robot velocity candidates may be generated, via the computer processor, in response to the detection of the first obstacle.

In some arrangements, one or more additional obstacle positions of one or more respective additional obstacles, one or more respective additional obstacle velocities of the one or more additional obstacles at the one or more respective additional obstacle positions, and one or more respective additional obstacle accelerations of the one or more additional obstacles at the one or more respective additional obstacle positions may be obtained during the first time cycle. The first new robot velocity may be selected as one at which the first new robot position of the robot at the completion of the second time cycle is outside of each of one or more respective additional obstacle first inflated boundaries of the respective one or more additional obstacles or may be the first reduced robot velocity when there is no reachable position for the robot outside of every one of the first obstacle first inflated boundary and the one or more respective additional obstacle first inflated boundaries at the completion of the second time cycle. The one or more additional obstacle first inflated boundaries may be those spaced by respective predetermined offsets from one or more respective additional obstacle first mobility boundaries reachable by the one or more respective additional obstacles from the one or more respective additional obstacle positions at the completion of the second time cycle.

In some arrangements, the one or more additional obstacle positions of the one or more respective additional obstacles, the one or more respective additional obstacle velocities of the one or more additional obstacles at the one or more respective additional obstacle positions, and the one or more respective additional obstacle accelerations of the one or more additional obstacles at the one or more respective additional obstacle positions may be stored, via the one or more computer processors, in a memory.

In some arrangements, any one or any combination of the one or more respective additional obstacle positions, the one or more respective additional obstacle velocities at the one or more respective additional obstacle positions, and the one or more respective additional obstacle accelerations at the one or more respective additional obstacle positions may be detected, via at least the first sensor or at least one other sensor, when being obtained.

In accordance with another aspect, a robot may navigate or may be navigated to a predetermined first static or dynamic target location within a dynamic environment in a process. The dynamic environment may have a predefined boundary. In this process, respective obstacle positions of a first set of obstacles within the predefined boundary, respective obstacle velocities of the first set of obstacles at the respective obstacle positions, and respective obstacle accelerations of the first set of obstacles at the respective obstacle positions may be obtained. A predefined quantity of respective obstacle trajectories for each of the obstacles of the first set of obstacles may be determined, via one or more computer processors and within a predetermined first time cycle, based on the respective obstacle velocities of the first set of obstacles at the respective obstacle positions and the respective obstacle accelerations of the first set of obstacles at the respective obstacle positions. A first new robot velocity to be implemented for the robot in a subsequent time cycle may be selected, via the one or more computer processors, from a first set of robot velocity candidates for the robot. The first new robot velocity i) may be one at which a first robot position of the robot at the completion of the subsequent time cycle overlaps none of the determined respective obstacle trajectories at the completion of the subsequent time cycle or ii) may be a first reduced robot velocity when there is no reachable position for the robot that does not overlap at least one of the determined respective obstacle trajectories at the completion of the subsequent time cycle. The robot may be at the first new robot velocity during the subsequent time cycle.

In some arrangements, the subsequent time cycle may be the same length as the first time cycle. In some other arrangements, the subsequent time may be a preset time period.

In some arrangements, any one or any combination of the respective obstacle positions, the respective obstacle velocities at the respective obstacle positions, and the respective obstacle accelerations at the respective obstacle positions may be detected, via at least the first sensor or at least one other sensor, when obtained.

In some arrangements, the first set of robot velocity candidates from a robot first velocity dynamic window may be determined, via the one or more computer processors, based on a current robot velocity of the robot and a current robot acceleration of the robot during the first time cycle.

In some arrangements, respective subsequent obstacle positions of the first set of obstacles, respective subsequent obstacle velocities of the first set of obstacles at the respective subsequent obstacle positions, and respective subsequent obstacle accelerations of the first set of obstacles at the respective obstacle positions may be obtained. A predefined quantity of respective subsequent obstacle trajectories for each of the obstacles of the first set of obstacles may be determined, via the one or more computer processors and within the subsequent time cycle, based on the respective subsequent obstacle velocities of the first set of obstacles at the respective subsequent obstacle positions and the respective obstacle accelerations of the first set of obstacles at the respective subsequent obstacle positions. A subsequent new robot velocity to be implemented for the robot in a further subsequent time cycle may be selected, via the one or more computer processors, from a subsequent set of robot velocity candidates for the robot. The subsequent new robot velocity i) may be one at which a subsequent robot position of the robot at the completion of the further subsequent time cycle overlaps none of the determined respective obstacle trajectories at the completion of the further subsequent time cycle or ii) may be a subsequent reduced robot velocity when there is no reachable position for the robot that does not overlap at least one of the determined respective obstacle trajectories at the completion of the further subsequent time cycle. The robot may be moved at the subsequent new robot velocity during the further subsequent time cycle. These steps may be repeated until the robot reaches the target location.

In some arrangements, the predefined quantity of the respective obstacle trajectories to be determined for each of the obstacles of the first set of obstacles within the first time cycle may be determined by a testing process prior to obtaining the respective obstacle positions. In some such arrangements of this process, at a step 1, a respective maximum translational velocity of each of obstacles of the first set of obstacles may be defined via the one or more computer processors. At a step 2, an obstacle velocity dynamic window for each of the obstacles of the first set of obstacles may be determined, via the computer processor, based on the respective maximum translational velocities of each of the obstacles of the first set of obstacles. At a step 3, a final step obstacle mobility boundary for each of the obstacles of the first set of obstacles at a final time step of the time interval T may be determined, via the computer processor, based on the respective maximum translational velocities of each of the obstacles of the first set of obstacles. At a step 4, test quantities of obstacle velocity candidates for each of the obstacles of the first set of obstacles may be generated via the one or more computer processors. At a step 5, respective test obstacle positions for each of the obstacles of the first set of obstacles may be determined via the one or more computer processors. Each of the respective test obstacle positions may be based on an initial position of the largest obstacle and a respective one of the largest obstacle velocity candidates. At a step 6, respective test obstacle regions for each of the obstacles of the first set of obstacles may be determined via the one or more computer processors. Each of the respective test obstacle regions may correspond to a predefined collision threshold applied about the respective test obstacle positions. At a step 7, steps 4-6 may be repeated by applying, at step 4, a larger test quantity of obstacle velocity candidates within the respective obstacle dynamic windows determined for each of the obstacles of the first set of obstacles than those generated during an immediately preceding performance of step 4 for any one or more of the obstacles of the first set of obstacles when the respective test obstacle regions of the one or more obstacles of the first set of obstacles do not cover the respective determined final step obstacle mobility boundary associated with the one or more obstacles of the first set of obstacles. At a step 8, the test quantities of the obstacle velocity candidates may be stored in a memory of the robot, via the one or more computer processors, for use as the predefined quantity of respective obstacle trajectories when the respective test obstacle regions of the one or more obstacles of the first set of obstacles cover the respective determined final step obstacle mobility boundary associated with the one or more obstacles of the first set of obstacles.

In some arrangements of the testing process prior to obtaining the respective obstacle positions, the larger test quantity of largest obstacle velocity candidates within the largest obstacle dynamic window applied at step 6 may be one greater than the one applied during the immediately preceding performance of step 3.

In some arrangements, the predefined collision threshold may be a circle having a predefined radius.

In accordance with another aspect, a robot may be configured for navigation to a predetermined first static or dynamic target location. The robot may include an object detection system, a computer system in communication with the object detection system, and a vehicle power system in communication with the computer system. The object detection system may be configured for obtaining, during a predetermined first time cycle, a first obstacle position of a first obstacle, a first obstacle velocity of the first obstacle at the first obstacle position, and a first obstacle acceleration of the first obstacle at the first obstacle position. The computer system may include a non-transitory computer-readable storage medium on which computer readable instructions of a program may be stored and one or more computer processors. The instructions, when executed by the one or more processors, may cause the computer system to perform a process. In the process, the computer system may determine, during the first time cycle, a first obstacle first velocity dynamic window for the first obstacle based on the first obstacle velocity and the first obstacle acceleration. In the process, the computer system may determine, during the first time cycle, a first obstacle first mobility boundary defining a first set of subsequent obstacle positions reachable by the first obstacle during or at the completion of a predetermined second time cycle following the first time cycle from the first obstacle position based on the first obstacle first velocity dynamic window in which the second time cycle may be of equal duration to the first time cycle. In the process, the computer system may select, during the first time cycle, a first new robot velocity to be applied to the robot at the completion of the first time cycle from a set of first new robot velocity candidates for the robot. The first new robot velocity may be i) one at which a first new robot position of the robot at the completion of the second time cycle is outside of a first obstacle first inflated boundary of the first obstacle spaced from the first obstacle first mobility boundary by a predetermined offset or ii) a first reduced robot velocity when there is no reachable position for the robot outside of the first obstacle first inflated boundary at the completion of the second time cycle. The vehicle power system may be configured for moving the robot at the first new robot velocity during the predetermined second time cycle and immediately following the first time cycle.

In some arrangements of this aspect, the robot is a vehicle, e.g., an autonomous or semi-autonomous vehicle.

In some arrangements of this aspect, the object detection system may include one or more Light Detection and Ranging (LiDAR) sensors. In some arrangements, the computer system may include a control module, which may include a central processing unit (CPU). In some arrangements, the vehicle power system may be a vehicle propulsion system. In some such arrangements, the vehicle propulsion system may include an engine or motor assembly and a power supply, e.g., a battery. In some arrangements, the computer system may be configured for controlling vehicle power system and thereby control the movement of the robot.

In some arrangements of this aspect, either one or both of the object detection system and the vehicle power system may be in communication with the computer system via any one or any combination of electrical, optical, and wireless communications or any other appropriate form of communication known to those skilled in the art. When either one of the object detection system and the vehicle power system are in electrical communication with the computer system, such electrical communications may be via one or more electrical wires. When either one of the object detection system and the vehicle power system are in optical communication with the computer system, such optical communications may be via one or more optical fibers. When either one of the object detection system and the vehicle power system are in wireless communication with the computer system, such wireless communications may be via a radio transmission from the object detection system to the computer system and a radio transmission from the computer system to the vehicle power system, respectively, e.g., from a radio transmitter or transceiver of the object detection system to a radio receiver or transceiver of or in electrical communication with the computer system, from a radio transmitter or transceiver of or in electrical communication with the computer system to a radio receiver or transceiver of or in electrical communication with the vehicle power system, or via other forms of wireless communication known to those skilled in the art.

In accordance with another aspect, a robot may be configured for navigation to a predetermined first static or dynamic target location within a dynamic environment. The dynamic environment may have a predefined boundary. The robot may include an object detection system, a computer system in communication with the object detection system, and a vehicle power system in communication with the computer system. The object detection system configured for obtaining respective obstacle positions of a first set of obstacles within the predefined boundary, respective obstacle velocities of the first set of obstacles at the respective obstacle positions, and respective obstacle accelerations of the first set of obstacles at the respective obstacle positions. The computer system may include a non-transitory computer-readable storage medium on which computer readable instructions of a program may be stored and one or more computer processors. The instructions, when executed by the one or more processors, may cause the computer system to perform a process. In the process, the computer system may determine, within a predetermined first time cycle, a predefined quantity of respective obstacle trajectories for each of the obstacles of the first set of obstacles based on the respective obstacle velocities of the first set of obstacles at the respective obstacle positions and the respective obstacle accelerations of the first set of obstacles at the respective obstacle positions. In the process, the computer system may select a first new robot velocity to be implemented for the robot in a subsequent time cycle from a first set of robot velocity candidates for the robot. The first new robot velocity may be i) one at which a first robot position of the robot at the completion of the subsequent time cycle overlaps none of the determined respective obstacle trajectories at the completion of the subsequent time cycle or ii) a first reduced robot velocity when there is no reachable position for the robot that does not overlap at least one of the determined respective obstacle trajectories at the completion of the subsequent time cycle. The vehicle power system may be configured for moving the robot at the first new robot velocity during the subsequent time cycle.

In some arrangements of this aspect, the robot is a vehicle, e.g., an autonomous or semi-autonomous vehicle.

In some arrangements of this aspect, the object detection system may include one or more LiDAR sensors. In some arrangements, the computer system may include a control module, which may include a CPU. In some arrangements, the vehicle power system may be a vehicle propulsion system. In some such arrangements, the vehicle propulsion system may include an engine or motor assembly and a power supply, e.g., a battery. In some arrangements, the computer system may be configured for controlling vehicle power system and thereby control the movement of the robot.

In some arrangements of this aspect, either one or both of the object detection system and the vehicle power system may be in communication with the computer system via any one or any combination of electrical, optical, and wireless communications or any other appropriate form of communication known to those skilled in the art. When either one of the object detection system and the vehicle power system are in electrical communication with the computer system, such electrical communications may be via one or more electrical wires. When either one of the object detection system and the vehicle power system are in optical communication with the computer system, such optical communications may be via one or more optical fibers. When either one of the object detection system and the vehicle power system are in wireless communication with the computer system, such wireless communications may be via a radio transmission from the object detection system to the computer system and a radio transmission from the computer system to the vehicle power system, respectively, e.g., from a radio transmitter or transceiver of the object detection system to a radio receiver or transceiver of or in electrical communication with the computer system, from a radio transmitter or transceiver of or in electrical communication with the computer system to a radio receiver or transceiver of or in electrical communication with the vehicle power system, or via other forms of wireless communication known to those skilled in the art.

BRIEF DESCRIPTION OF THE DRAWINGS

By way of description only, embodiments of the present disclosure are described herein with reference to the accompanying figures, in which.

DETAILED DESCRIPTION

Figure 1:
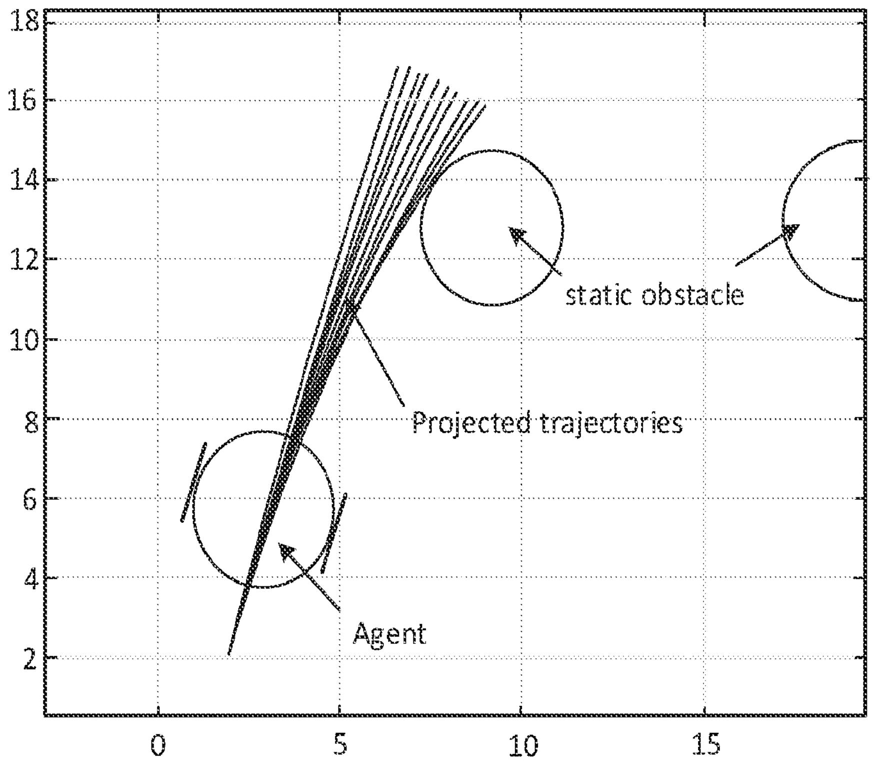
FIG. 1 (Prior Art)
FIG. 1 is a schematic plot of admissible velocities of an AV agent within a static obstacle environment.
Figure 2:
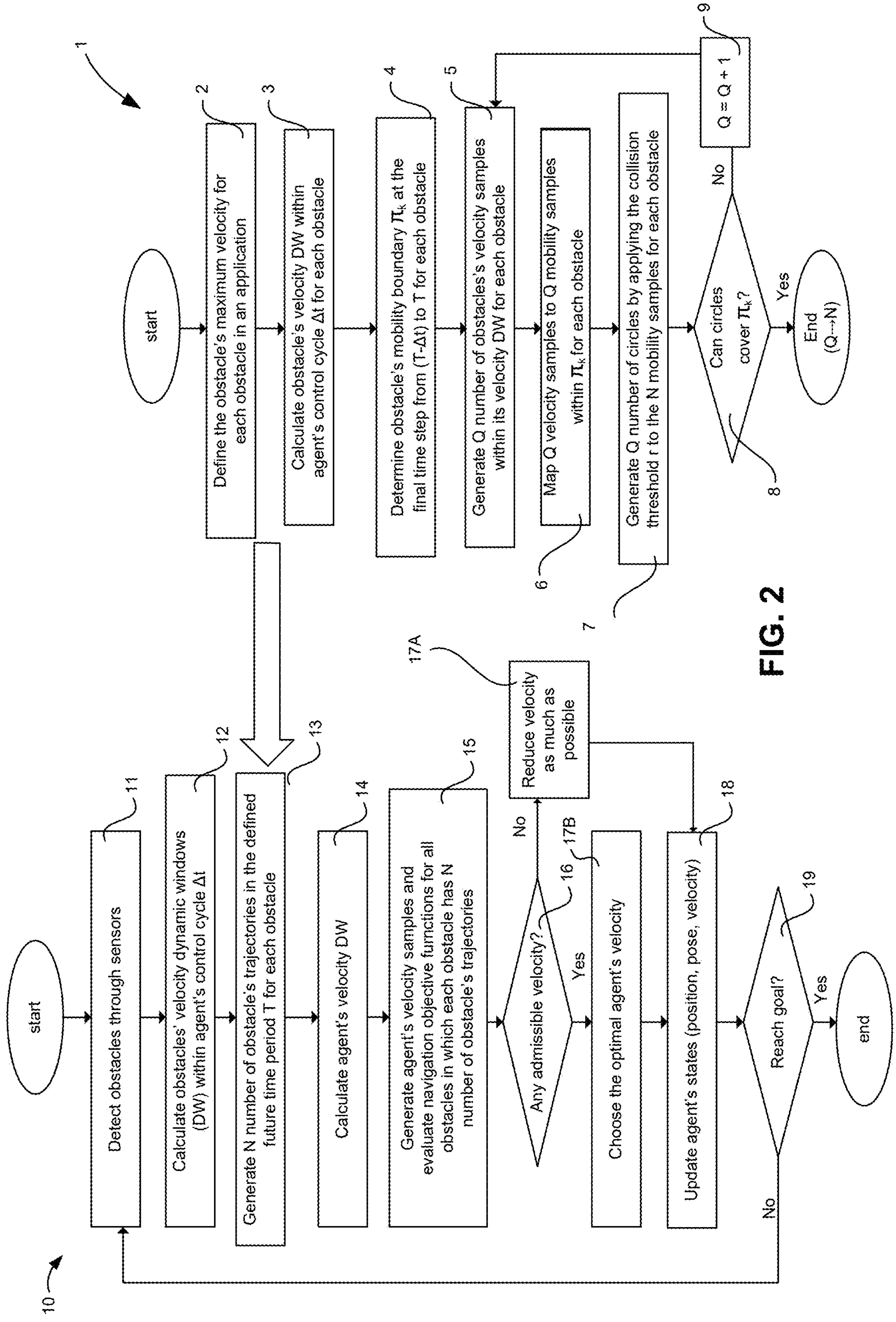
FIG. 2 is a process flow diagram for an AV agent to reach a goal destination using a process for identifying and applying an admissible velocity for the agent based on an obstacle's mobility samples.

Referring now to FIG. 2, modified DWA approach process 10 identifies admissible velocities of an agent, e.g., a robot, based on mobility samples for obstacles within an operating environment of the agent. Upon the start of collision-free travel of an agent using approach 10, at step 11 that occurs during one control cycle $\Delta t_i$ of the agent and which may be said to begin at time to, the agent detects obstacles in a sensing range of the agent using sensors on the robot, which may be but are not limited to being one or more Light Detection and Ranging (LiDAR) sensors. In arrangements that employ LiDAR sensors, the detected light may be used to develop respective collision cones and/or collision cone boundaries relating to each of the identified obstacles. At step 12, a velocity DW within the agent's control cycle $\Delta t_i$, e.g., 0.1 seconds, is calculated, e.g., via one or more microprocessors or microcontrollers of the agent, for each of the detected obstacles using Criterion 1. At step 13, a quantity of N trajectories for each obstacle at the end of preset time period T are projected by the agent by applying Criterion 2.1 or 2.2, as appropriate, via one or more microprocessors or microcontrollers of the agent, using $k=T/\Delta t$ time steps. For example, for a time period T preset via one or more microprocessors or microcontrollers of the agent to three (3) seconds and an agent control cycle $\Delta t_i=0.1$ sec, the agent would project each obstacle's trajectory 30 cycles out based on the respective current translational and angular velocities and current translational and angular accelerations or decelerations of each obstacle and assuming the angular accelerations or decelerations remain constant over the period T.

Still referring to FIG. 2, the value of N for the number of trajectories to be projected by the agent may be determined, in some arrangements, by trajectory sample count determination process 1, which may be conducted during an offline analysis prior to the travel of the agent using modified DWA approach process 10. At step 2 of trajectory sample count determination process 1, an obstacle velocity DW with the agent's control cycle $\Delta t_i$ is calculated, via one or more microprocessors or microcontrollers of one or more local or remote computers designated for conducting such analysis, for each of the obstacles planned for the operating environment of the agent during operation of the agent using modified DWA approach process 10. To obtain a worst-case scenario, the obstacle velocity DW for each of the obstacles preferably may be determined using a respective maximum translational velocity for each of the obstacles such that the obstacles' translational velocity as well as the obstacles' translational and rotational accelerations are not needed to determine the respective obstacle velocity DWs.

At step 4 of process 1, an obstacle mobility boundary $\Pi_k$ for each of the obstacles is determined, via the one or more microprocessors or microcontrollers of the one or more local or remote computers designated for conducting such analysis, using Criterion 2.1 or 2.2, as appropriate, at a final time step over the time period of travel T for the agent, i.e., the period $(T-\Delta_t)$ to T. To obtain a worst-case scenario, i.e., a largest possible obstacle mobility boundary, the maximum translational velocity is used as the velocity in Criterion 2.1 or 2.2, as appropriate, and rotational velocity is not considered. The sample starting positions $(x_0^{obs}, y_0^{obs})$ for each of the obstacles may be determined, via the one or more microprocessors or microcontrollers of the one or more local or remote computers designated for conducting such analysis, by a known sampling scheme such as a full factorial sampling, and further may depend on the shape of the region $\Pi_k$ in order to obtain starting positions that lead to the largest possible obstacle mobility boundaries for each of the respective obstacles. As such, it is to be understood that the sample starting positions and thereby the chosen sampling scheme influences the minimum number of required samples.

At step 5 of process 1, regardless of the shape of the region $\Pi_k$, a set of quantity Q obstacle velocity samples from the respective velocity spaces $(v^{bs}, \omega^{obs})$ of each of the obstacles are selected for each of the obstacles, via the one or more microprocessors or microcontrollers of the one or more local or remote computers designated for conducting such analysis, by a known sampling scheme such as a fractional factorial sampling where $Q=m\times n$ and m and n are the number of discrete levels for translational and angular velocity in $V_d^{obs}$, respectively. It is to be understood that the value of Q may be the same or may vary among the set of obstacles being evaluated.

At step 6 of process 1, each velocity sample for the set of quantity Q obstacle velocity samples of each of the obstacles are applied using Criterion 2.1 or 2.2, as appropriate, at the final time step, i.e., the period (T-d t) to T, via the one or more microprocessors or microcontrollers of the one or more local or remote computers designated for conducting such analysis, to obtain quantity Q, e.g., 3, 4, 5, . . . , of sample projected mobility positions for each of the obstacles. Again, it is to be understood that the value of Q may be the same or may vary among the set of obstacles being evaluated. In one example shown in FIG. 3, obstacle 21 having a maximum translational velocity $v_{max}^{obs}$ and having a current position within test environment 20 (represented as a plot) as shown may have sample projected mobility positions at the centers of regions 22A-22I. As shown, Q=9 in this example.

Figure 3:
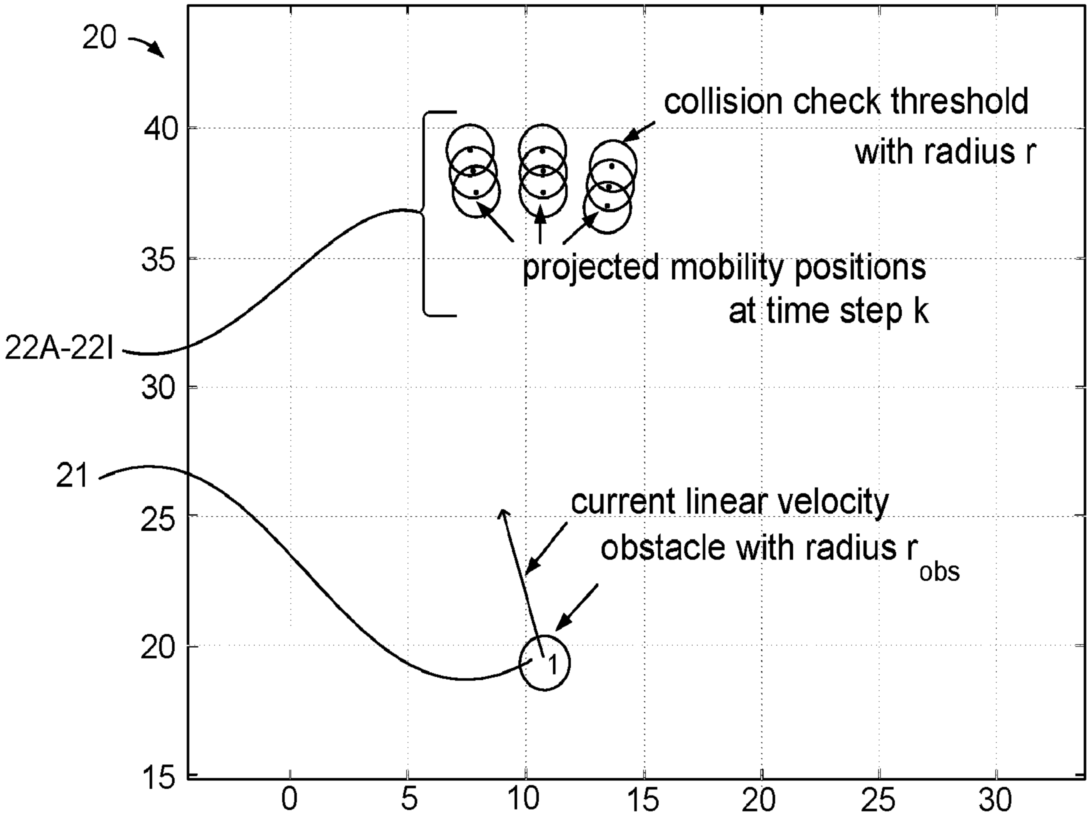
FIG. 3 is a schematic plot of a predefined set of projected mobility positions of an obstacle of radius $r_{obs}$ to assess coverage by the projected mobility positions over an entire obstacle mobility boundary $\Pi_k$ at a final time step within a time interval T.

At step 7 of process 1, for each of the obstacles, a collision threshold r is then applied, via the one or more microprocessors or microcontrollers of the one or more local or remote computers designated for conducting such analysis, to each of the sample mobility boundaries. The collision threshold r may be a radius dependent on the radius of each of the respective obstacles such that the collision threshold may vary from obstacle to obstacle. In some arrangements, the collision threshold may be defined by $r_{agent}+r_{obs}$ (see Criterion 3.1 or 3.2, as appropriate). The collision threshold r applied to the sample mobility boundaries defines an inflated sample mobility boundary. In the example of FIG. 3, regions 22A-22I are defined by a collision threshold r.

At step 8, for each of the obstacles, a combination of the Q inflated sample mobility boundaries defined at step 7 and associated with the obstacles is compared, via the one or more microprocessors or microcontrollers of the one or more local or remote computers designated for conducting such analysis, to the respective obstacle mobility boundary $\Pi_k$. In the example of FIG. 3, the combination of regions 22A-22I would be compared to the obstacle mobility boundary $\Pi_k$ as described previously herein with respect to step 4. If the combination of the inflated sample mobility boundaries is determined not to cover the entirety of the respective obstacle mobility boundary $\Pi_k$, then, via step 9, steps 5-8 are repeated with Q=Q+1. If the combination of the inflated sample mobility boundaries is determined to cover the entirety of the respective obstacle mobility boundary $\Pi_k$, then Q becomes N at step 13 of modified DWA approach process 10. Preferably, the initial value of Q would be low enough such that steps 5-8 must be repeated in order that a minimum value of Q that covers the entirety of the respective obstacle mobility boundary $\Pi_k$ may be determined as such minimum value of Q would provide the most efficient number of velocity samples, i.e., velocity candidates for the agent to evaluate while applying modified DWA approach process 10 during travel.

Still referring to FIG. 2 but now referring again to modified DWA approach process 10, at step 14, the agent's velocity DW, i.e., $V_d^{agent}$, is calculated, via the one or more microprocessors or microcontrollers of the agent, using Criterion 1. Step 14 may be performed at any time prior to step 15, including before, simultaneously with, or after any one or any combination of steps 11-13. Then, at step 15, the agent's velocity samples, i.e., candidate velocities, are generated, via the one or more microprocessors or microcontrollers of the agent. Such velocity samples, as described previously herein, are subject to the control resolution of the linear and angular velocities within $V_d^{agent}$ that are achievable by the agent. For example, if the agent has six linear velocity settings and five angular velocity settings, then a total of thirty settings are available as candidate velocities. At this step 15, the portion of those candidate velocities that are determined, via the one or more microprocessors or microcontrollers of the agent, to be within $V_d^{agent}$, are then evaluated relative to a navigation objective function such as Criterion 4. At step 16, the candidate velocities within $V_d^{agent}$ are then evaluated using Criterion 3.1 or 3.2, as appropriate, as to their admissibility over the time period T. In such evaluation, a candidate velocity is considered admissible when Criterion 3 is determined, via the one or more microprocessors or microcontrollers of the agent, to be satisfied based on such candidate velocity for every one of the respective N samples of obstacle trajectories for each one of the obstacles. For example, if there are two obstacles in which N=10 for the first obstacle and N=11 for the second obstacle, then Criterion 3.1 or 3.2, as appropriate, must be satisfied by a candidate velocity for all ten sample trajectories for the first obstacle and all eleven sample trajectories for the second obstacle for the candidate velocity to be considered admissible.

Where there are no admissible candidate velocities, the agent is configured to reduce its velocity, as may be directed via the one or more microprocessors or microcontrollers of the agent, as much as possible during the next control cycle $t_{i+1}$, as shown at step 17A. Otherwise, at step 17B, an optimal agent velocity is selected, via the one or more microprocessors or microcontrollers of the agent, for the velocity of the agent during the next control cycle $t_{i+1}$. The optimal velocity, in this example, is the admissible velocity with the highest value determined by the objective function.

In some arrangements, steps 15 and 16 may be reversed such that the determination as to the admissibility of candidate velocities is made prior to the evaluation of the objective functions. In this instance, to reduce the number of evaluations to be made against the objective functions calculated for each of the obstacles, only admissible candidate velocities may be evaluated against the objective function for each of the obstacles.

At step 18, after completion of either step 17A or step 17B, the agent updates, via the one or more microprocessors or microcontrollers of the agent, its current position and velocity, and in some arrangements, its pose or other such orientational characteristics. Then, at step 19, if the agent determines, via the one or more microprocessors or microcontrollers of the agent, that the agent has not reached its destination goal, then steps 11-19 are repeated. If, at step 19, the agent determines, via the one or more microprocessors or microcontrollers of the agent, that the agent has reached its destination goal, then the modified DWA approach process ends. At this point, the agent preferably stops its movement.

Figure 4:
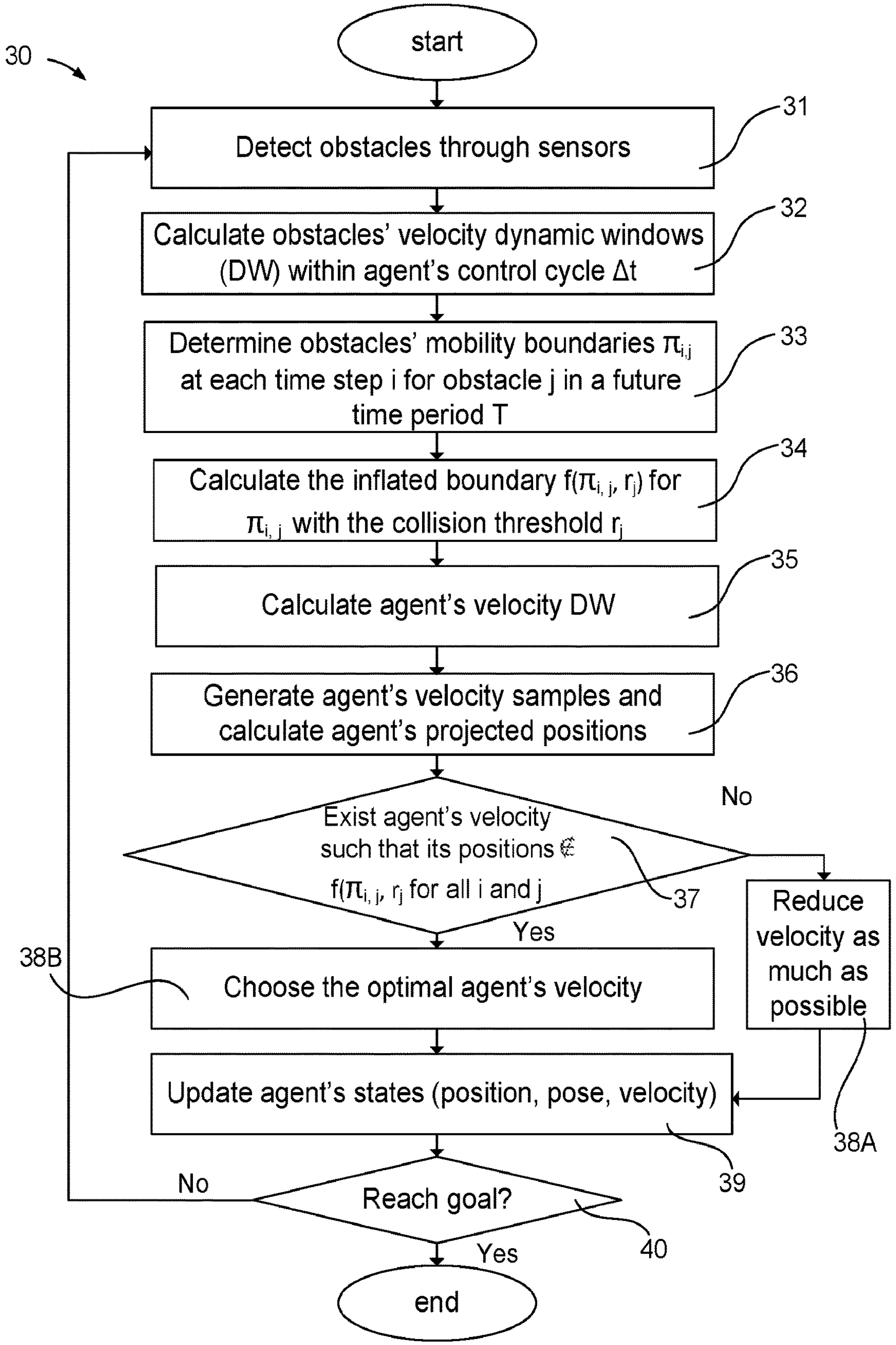
FIG. 4 is a process flow diagram for an AV agent to reach a goal destination using a process for identifying and applying an admissible velocity for the agent based on an obstacle's mobility regions.

Referring now to FIG. 4, modified DWA approach process 30 identifies admissible velocities of an agent, e.g., a robot, based on mobility boundaries for obstacles within an operating environment of the agent. In approach process 30, steps 31 and 32 are the same as steps 11 and 12 for modified DWA approach process 10. At step 33, mobility boundaries $\Pi_{i,j}$ for each obstacle j at future time step i of future time period T are determined, via the one or more microprocessors or microcontrollers of the agent, using Criterion 2.1 or 2.2 as appropriate. One example of such a mobility boundary is boundary 51 within operating environment 50 (represented as a plot) in FIG. 5. Mobility boundary 51 is a mobility boundary at time step k for an obstacle.

Figure 5:
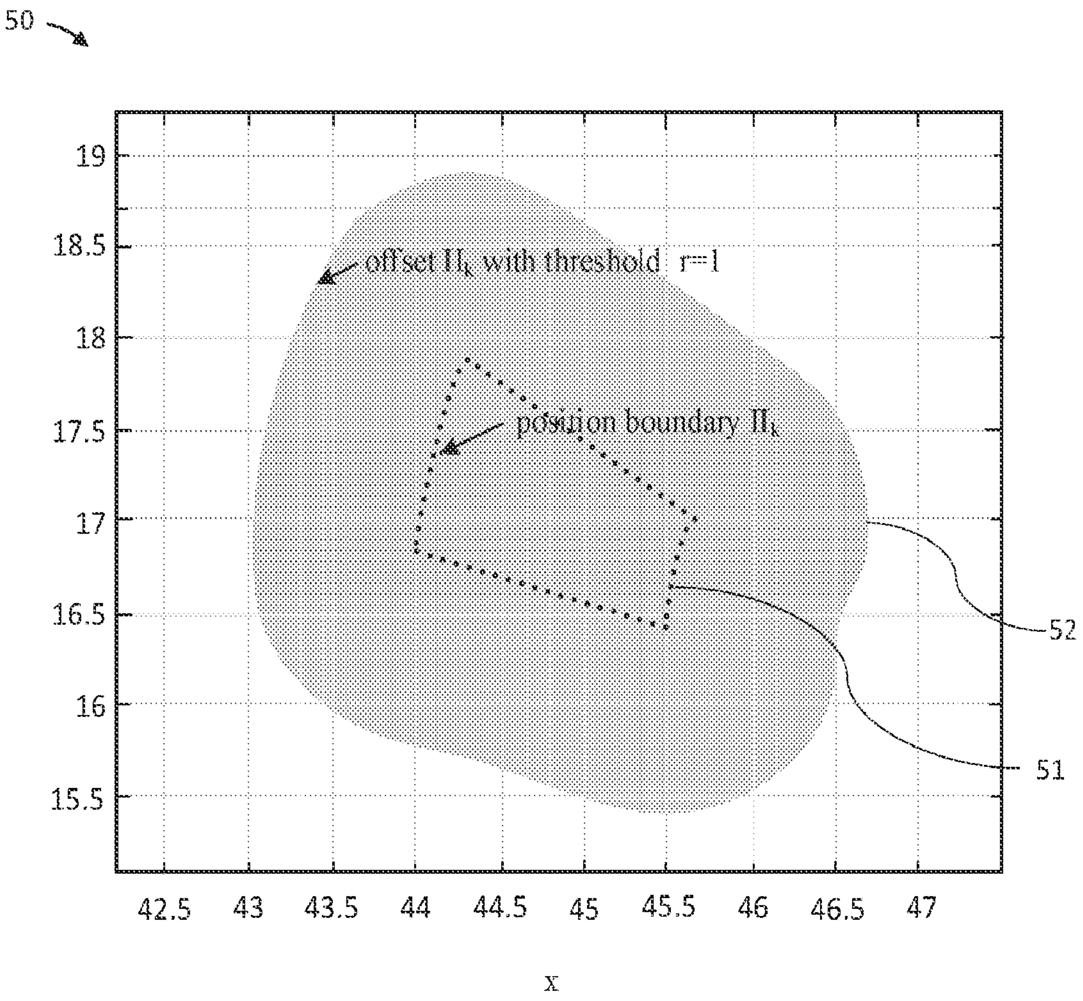
FIG. 5 is a schematic plot of an example position boundary $\Pi_k$ for an obstacle with a predefined offset of radius r=1 as a safety threshold for which an agent's position is inadmissible.

Then, at step 34, each of the mobility boundaries $\Pi_{i,j}$ determined at step 33 are inflated to inflated boundaries using the polygon offset function $f_{offset}(\Pi_i, r)$ of Criterion 5.1 or 5.2, as appropriate. In such arrangement, offset constant r provides a safety factor to avoid a collision with the agent and preferably may take into account a size, e.g., a radius $r_{agent}$, of the agent and a size, e.g., a radius $r_{obs}$, of the obstacle. In the example of FIG. 5 for a 2D system, inflated boundary 52 is illustrated as the inflated boundary for an obstacle with the offset constant r=1. The mobility boundary for 3D systems is a 3D mobility boundary.

At step 35 of approach process 30, the agent's velocity DW, i.e., $V_d^{agent}$, is calculated in the same manner as in step 14 of modified DWA approach process 10. Step 35 may be performed at any time prior to step 36, including before, simultaneously with, or after any one or any combination of steps 31-34.

Then, at step 36, the agent's velocity samples, i.e., candidate velocities, are generated, via the one or more microprocessors or microcontrollers of the agent as described previously herein with respect to step 15 of process 10. At this same step, the projected positions (and in some instances the projected poses or other orientations) of the agent by the end of the next time step i+1 is determined, via the one or more microprocessors or microcontrollers of the agent, for each of the agent's velocity samples that are within $V_d^{agent}$ based on the position and velocity (and respectively the pose when appropriate) of the agent at time step i (see Criterion 2.1 or 2.2, as appropriate). Isolation of the agent's velocity samples that are within $V_d^{agent}$ could be performed by the agent, via the one or more microprocessors or microcontrollers of the agent, at a later step of approach 30, but such an order of steps would be inefficient.

Then, at step 37, the projected positions for each of the candidate velocities of the agent within $V_d^{agent}$ are compared, via the one or more microprocessors or microcontrollers of the agent, to each of the inflated boundaries determined at step 34 and that are based on the mobility boundaries $\Pi_{i,j}$ determined at step 33 and described above. Each of the projected positions that do not overlap any of the determined inflated boundaries are admissible velocities, which the agent may be configured to identify as such via the one or more microprocessors or microcontrollers of the agent. Where there are no admissible candidate velocities within $V_d^{agent}$ the agent is configured to reduce its velocity, as may be directed via the one or more microprocessors or microcontrollers of the agent, as much as possible during the next control cycle $t_{i+1}$, as shown at step 38A. Otherwise, at step 38B, an optimal agent velocity is selected, via the one or more microprocessors or microcontrollers of the agent, for the velocity of the agent during the next control cycle $t_{i+1}$. The optimal velocity may be the admissible velocity within $V_d^{agent}$ with the highest value determined by an objective function such as Criterion 4.

At step 39, after completion of either step 38A or step 38B, the agent updates, via the one or more microprocessors or microcontrollers of the agent, its current position and velocity, and in some arrangements, its pose or other such orientational characteristics. Then, at step 40, if the agent determines, via the one or more microprocessors or microcontrollers of the agent, that the agent has not reached its destination goal, then steps 31-40 are repeated. If, at step 40, the agent determines, via the one or more microprocessors or microcontrollers of the agent, that the agent has reached its destination goal, then the modified DWA approach process ends. At this point, the agent preferably stops its movement.

It is to be understood that the disclosure set forth herein includes any possible combinations of the particular features set forth above, whether specifically disclosed herein or not. For example, where a particular feature is disclosed in the context of a particular aspect, arrangement, configuration, or embodiment, that feature can also be used, to the extent possible, in combination with and/or in the context of other particular aspects, arrangements, configurations, and embodiments of the disclosure. Furthermore, although the disclosure herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present disclosure as defined by the appended claims.

The invention claimed is:

1. A method of navigation by a robot to a predetermined first static or dynamic target location, comprising:

obtaining, during a predetermined first time cycle, a first obstacle position of a first obstacle, a first obstacle velocity of the first obstacle at the first obstacle position, and a first obstacle acceleration of the first obstacle at the first obstacle position;

determining, via one or more computer processors and during the first time cycle, a first obstacle first velocity dynamic window for the first obstacle based on the first obstacle velocity and the first obstacle acceleration;

determining, via one or more computer processors and during the first time cycle, a first obstacle first mobility boundary defining a first set of subsequent obstacle positions reachable by the first obstacle during or at the completion of a predetermined second time cycle following the first time cycle from the first obstacle position based on the first obstacle first velocity dynamic window, the second time cycle being of equal duration to the first time cycle;

selecting, via one or more computer processors and during the first time cycle, a first new robot velocity to be applied to the robot at the completion of the first time cycle from a set of first new robot velocity candidates for the robot, wherein (i) when there is a reachable position for the robot outside of the first obstacle first inflated boundary at the completion of the second time cycle, the first new robot velocity is one at which a first new robot position of the robot at the completion of the second time cycle is outside of a first obstacle first inflated boundary of the first obstacle spaced from the first obstacle first mobility boundary by a predetermined offset and (ii) when there is no reachable position for the robot outside of the first obstacle first inflated boundary at the completion of the second time cycle, the first new robot velocity is a first reduced robot velocity; and moving the robot at the first new robot velocity during the predetermined second time cycle and immediately following the first time cycle.

2. The method of claim 1, wherein the obtaining step comprises detecting, via at least a first sensor, any one or any combination of the first obstacle position, the first obstacle velocity at the first obstacle position, and the first obstacle acceleration at the first obstacle position.

3. The method of claim 1, further comprising determining, via the one or more computer processors, the first obstacle first inflated boundary by offsetting each of the obstacle positions of the first set of subsequent obstacle positions reachable by the first obstacle during or at the completion of the predetermined second time cycle by a fixed distance in radial directions from the first obstacle first mobility boundary.

4. The method of claim 1, further comprising determining the set of first new robot velocity candidates from a robot first velocity dynamic window based on a current robot velocity of the robot, and a current robot acceleration of the robot during the first time cycle.

5. The method of claim 1, wherein the selecting of the first new robot velocity comprises:

determining a set of first new robot position candidates corresponding to the set of first new robot velocity candidates, the set of first new robot position candidates being at radial distances from a current position of the robot equal to a product of a length of the first time cycle and respective ones of the set of first new robot velocity candidates; and comparing the set of first new robot position candidates to the first obstacle first inflated boundary.

6. The method of claim 1, wherein the selecting of the first new robot velocity comprises selecting a first new robot velocity candidate of the set of first new robot velocity candidates having the highest value based on an objective function.

7. The method of claim 1, further comprising:

1) Obtaining, at or after the completion of the moving of the robot and during a predetermined subsequent time cycle, a first obstacle actual position of the obstacle, a first obstacle actual velocity of the first obstacle at the first obstacle actual position, and a first obstacle actual acceleration of the first obstacle at the first obstacle actual position;

determining, via one or more computer processors and during the subsequent time cycle, a first obstacle subsequent velocity dynamic window for the first obstacle based on the first obstacle actual velocity and the first obstacle actual acceleration;

determining, via one or more computer processors and during the subsequent time cycle, a first obstacle subsequent mobility boundary defining a second set of subsequent obstacle positions reachable by the first obstacle during or at the completion of a predetermined further subsequent time cycle following the subsequent time cycle from the first obstacle actual position based on the first obstacle subsequent velocity dynamic window;

2) Selecting, via one or more computer processors and during the subsequent time cycle, a subsequent new robot velocity to be applied to the robot at the completion of the subsequent time cycle from a set of subsequent new robot velocity candidates for the robot, the subsequent new robot velocity i) being one at which a subsequent new robot position of the robot at the completion of the further subsequent time cycle is outside of a first obstacle subsequent inflated boundary of the first obstacle spaced from the first obstacle subsequent mobility boundary by a predetermined offset or ii) being a subsequent reduced robot velocity when there is no reachable position for the robot outside of the first obstacle subsequent inflated boundary at the completion of the further subsequent time cycle, the subsequent and the further subsequent time cycles being of equal duration to the first time cycle;

3) Moving the robot at the subsequent new robot velocity during the further subsequent time cycle; and 4) Repeating steps 1-3 until the robot reaches the target location.

8. The method of claim 1, wherein a maximum first obstacle linear velocity is stored, via the one or more computer processors, in a memory of the robot, and wherein the first obstacle velocity dynamic window is limited by the maximum first obstacle linear velocity.

9. The method of claim 1, further comprising wirelessly receiving, via a radio receiver, any one or any combination of the first obstacle velocity, the first obstacle acceleration, and a maximum first obstacle linear velocity from the first obstacle upon the detecting of the first obstacle; and storing, via the one or more computer processors, in a memory of the robot the one or combination of the first obstacle velocity, the first obstacle acceleration, and the maximum first obstacle linear velocity wirelessly received.

10. The method of claim 1, further comprising generating, via the one or more computer processors, the set of first new robot velocity candidates in response to detection of the first obstacle.

11. The method of claim 1, further comprising obtaining one or more additional obstacle positions of one or more respective additional obstacles, one or more respective additional obstacle velocities of the one or more additional obstacles at the one or more respective additional obstacle positions, and one or more respective additional obstacle accelerations of the one or more additional obstacles at the one or more respective additional obstacle positions during the first time cycle, wherein the first new robot velocity is selected as one at which the first new robot position of the robot at the completion of the second time cycle is outside of each of one or more respective additional obstacle first inflated boundaries of the respective one or more additional obstacles or is the first reduced robot velocity when there is no reachable position for the robot outside of every one of the first obstacle first inflated boundary and the one or more respective additional obstacle first inflated boundaries at the completion of the second time cycle, the one or more additional obstacle first inflated boundaries being spaced by respective predetermined offsets from one or more respective additional obstacle first mobility boundaries reachable by the one or more respective additional obstacles from the one or more respective additional obstacle positions at the completion of the second time cycle.

12. The method of claim 11, wherein the obtaining step comprises detecting, via at least a first sensor, any one or any combination of the one or more respective additional obstacle positions, the one or more respective additional obstacle velocities at the one or more respective additional obstacle positions, and the one or more respective additional obstacle accelerations at the one or more respective additional obstacle positions.

13. A method of navigation by a robot to a predetermined first static or dynamic target location within a dynamic environment, the dynamic environment having a predefined boundary, comprising:

obtaining respective obstacle positions of a first set of obstacles within the predefined boundary, respective obstacle velocities of the first set of obstacles at the respective obstacle positions, and respective obstacle accelerations of the first set of obstacles at the respective obstacle positions;

determining, via one or more computer processors and within a predetermined first time cycle, a predefined quantity of respective obstacle trajectories for each of the obstacles of the first set of obstacles based on the respective obstacle velocities of the first set of obstacles at the respective obstacle positions and the respective obstacle accelerations of the first set of obstacles at the respective obstacle positions;

selecting, via the one or more computer processors, a first new robot velocity to be implemented for the robot in a subsequent time cycle from a first set of robot velocity candidates for the robot, wherein:

when there is a reachable position for the robot outside of the first obstacle first inflated boundary at the completion of the second time cycle the first new robot velocity is one at which a first robot position of the robot at the completion of the subsequent time cycle overlaps none of the determined respective obstacle trajectories at the completion of the subsequent time cycle and when there is no reachable position for the robot that does not overlap at least one of the determined respective obstacle trajectories at the completion of the subsequent time cycle, the first new robot velocity is a first reduced robot velocity; and moving the robot at the first new robot velocity during the subsequent time cycle.

14. The method of claim 13, wherein the obtaining step comprises detecting, via at least a first sensor or at least one other sensor, any one or any combination of the respective obstacle positions, the respective obstacle velocities at the respective obstacle positions, and the respective obstacle accelerations at the respective obstacle positions.

15. The method of claim 13, further comprising determining, via the one or more computer processors, the first set of robot velocity candidates from a robot first velocity dynamic window based on a current robot velocity of the robot and a current robot acceleration of the robot during the first time cycle.

16. The method of claim 13, further comprising:

1) Obtaining respective subsequent obstacle positions of the first set of obstacles, respective subsequent obstacle velocities of the first set of obstacles at the respective subsequent obstacle positions, and respective subsequent obstacle accelerations of the first set of obstacles at the respective obstacle positions;

2) Determining, via the one or more computer processors and within the subsequent time cycle, a predefined quantity of respective subsequent obstacle trajectories for each of the obstacles of the first set of obstacles based on the respective subsequent obstacle velocities of the first set of obstacles at the respective subsequent obstacle positions and the respective obstacle accelerations of the first set of obstacles at the respective subsequent obstacle positions;

selecting, via the one or more computer processors, a subsequent new robot velocity to be implemented for the robot in a further subsequent time cycle from a subsequent set of robot velocity candidates for the robot, the subsequent new robot velocity i) being one at which a subsequent robot position of the robot at the completion of the further subsequent time cycle overlaps none of the determined respective obstacle trajectories at the completion of the further subsequent time cycle or ii) being a subsequent reduced robot velocity when there is no reachable position for the robot that does not overlap at least one of the determined respective obstacle trajectories at the completion of the further subsequent time cycle;

3) Moving the robot at the subsequent new robot velocity during the further subsequent time cycle; and 4) Repeating steps 1-3 until the robot reaches the target location.

17. The method of claim 13, further comprising determining the predefined quantity of the respective obstacle trajectories to be determined for each of the obstacles of the first set of obstacles within the first time cycle by, prior to obtaining the respective obstacle positions:

1) Defining, via the one or more computer processors, a respective maximum translational velocity of each of obstacles of the first set of obstacles;

2) Determining, via the one or more computer processors, an obstacle velocity dynamic window for each of the obstacles of the first set of obstacles based on the respective maximum translational velocities of each of the obstacles of the first set of obstacles;

3) Determining, via the one or more computer processors, a final step obstacle mobility boundary for each of the obstacles of the first set of obstacles at a final time step of a time interval T based on the respective maximum translational velocities of each of the obstacles of the first set of obstacles;

4) Generating, via the one or more computer processors, test quantities of obstacle velocity candidates for each of the obstacles of the first set of obstacles;

5) Determining, via the one or more computer processors, respective test obstacle positions for each of the obstacles of the first set of obstacles, each of the respective test obstacle positions being based on an initial test obstacle position of a largest obstacle of the first set of obstacles and a respective one of the largest obstacle velocity candidates;

6) Determining, via the one or more computer processors, respective test obstacle regions for each of the obstacles of the first set of obstacles, each of the respective test obstacle regions corresponding to a predefined collision threshold applied about the respective test obstacle positions;

7) Repeating steps 4-6 by applying, in step 4, a larger test quantity of obstacle velocity candidates within the respective obstacle dynamic windows determined for each of the obstacles of the first set of obstacles than those generated during an immediately preceding performance of step 4 for any one or more of the obstacles of the first set of obstacles when the respective test obstacle regions of the one or more obstacles of the first set of obstacles do not cover the respective determined final step obstacle mobility boundary associated with the one or more obstacles of the first set of obstacles; and 8) Storing in a memory of the robot, via the one or more computer processors, the test quantities of the obstacle velocity candidates for use as the predefined quantity of respective obstacle trajectories when the respective test obstacle regions of the one or more obstacles of the first set of obstacles cover the respective determined final step obstacle mobility boundary associated with the one or more obstacles of the first set of obstacles.

18. The method of claim 17, wherein the larger test quantity of largest obstacle velocity candidates within a largest obstacle dynamic window applied at step 6 is one greater than the one applied during an immediately preceding performance of step 3.

19. The method of claim 17, wherein the predefined collision threshold is a circle having a predefined radius.

20. A robot configured for navigation to a predetermined first static or dynamic target location, comprising:

an object detection system configured for obtaining, during a predetermined first time cycle, a first obstacle position of a first obstacle, a first obstacle velocity of the first obstacle at the first obstacle position, and a first obstacle acceleration of the first obstacle at the first obstacle position;

a computer system in communication with the object detection system and comprising a non-transitory computer-readable storage medium on which computer readable instructions of a program are stored and one or more computer processors, wherein the instructions, when executed by the one or more processors, cause the computer system to perform the following:

(i) determine, during the first time cycle, a first obstacle first velocity dynamic window for the first obstacle based on the first obstacle velocity and the first obstacle acceleration;

(ii) determine, during the first time cycle, a first obstacle first mobility boundary defining a first set of subsequent obstacle positions reachable by the first obstacle during or at the completion of a predetermined second time cycle following the first time cycle from the first obstacle position based on the first obstacle first velocity dynamic window, the second time cycle being of equal duration to the first time cycle; and (iii) select, during the first time cycle, a first new robot velocity to be applied to the robot at the completion of the first time cycle from a set of first new robot velocity candidates for the robot, wherein: when there is a reachable position for the robot outside of the first obstacle first inflated boundary at the completion of the second time cycle the first new robot velocity is one at which a first new robot position of the robot at the completion of the second time cycle is outside of a first obstacle first inflated boundary of the first obstacle spaced from the first obstacle first mobility boundary by a predetermined offset and when there is no reachable position for the robot outside of the first obstacle first inflated boundary at the completion of the second time cycle, the first new robot velocity is a first reduced robot velocity; and a vehicle power system in communication with the computer system and configured for moving the robot at the first new robot velocity during the predetermined second time cycle and immediately following the first time cycle.

* * * * *